(12) United States Patent
Suppes (10) Patent No.: US 9,461,298 B2
(45) Date of Patent: Oct. 4, 2016

(54) SPIRAL-WOUND CONVECTION BATTERY AND METHODS OF OPERATION

(71) Applicant: Homeland Technologies, LLC, Columbia, MO (US)

(72) Inventor: Galen J. Suppes, Columbia, MO (US)

(73) Assignee: Homeland Technologies, LLC, Columbia, MO (US)

( * ) Notice: Subject to any disclaimer, the term of this patent is extended or adjusted under 35 U.S.C. 154(b) by 423 days.

(21) Appl. No.: 13/772,068

(22) Filed: Feb. 20, 2013

(65) Prior Publication Data

US 2013/0187618 A1    Jul. 25, 2013

Related U.S. Application Data

(63) Continuation-in-part of application No. 13/126,791, filed on Nov. 10, 2011, now abandoned.

(60) Provisional application No. 61/601,106, filed on Feb. 21, 2012, provisional application No. 61/702,816, filed on Sep. 19, 2012.

(51) Int. Cl.
| | |
|---|---|
| *H02J 7/00* | (2006.01) |
| *H01M 2/38* | (2006.01) |
| *H01M 10/44* | (2006.01) |
| *H01M 10/04* | (2006.01) |
| *H01M 10/0525* | (2010.01) |
| *H01M 10/0587* | (2010.01) |

(52) U.S. Cl.
CPC ........... *H01M 2/38* (2013.01); *H01M 10/0431* (2013.01); *H01M 10/0525* (2013.01); *H01M 10/0587* (2013.01); *H01M 10/44* (2013.01); *Y02E 60/122* (2013.01); *Y02P 70/54* (2015.11)

(58) Field of Classification Search
CPC ........................................................ H02J 7/00
USPC ........................................................ 320/137
See application file for complete search history.

(56) References Cited

U.S. PATENT DOCUMENTS

| | | | | |
|---|---|---|---|---|
| 3,713,413 | A * | 1/1973 | Nakamura | 114/20.1 |
| 4,490,443 | A * | 12/1984 | Ruch et al. | 429/405 |
| 5,614,332 | A * | 3/1997 | Pavelle et al. | 429/68 |
| 6,387,561 | B1 * | 5/2002 | Nemoto et al. | 429/51 |
| 6,558,833 | B2 * | 5/2003 | McCoy | 429/70 |
| 2004/0169493 | A1 * | 9/2004 | Tsutsui et al. | 320/128 |
| 2005/0031938 | A1 * | 2/2005 | Burdine et al. | 429/68 |
| 2005/0275380 | A1 * | 12/2005 | McCall et al. | 320/137 |
| 2011/0206959 | A1 * | 8/2011 | Suppes | 429/67 |

* cited by examiner

Primary Examiner — Mohammed Alam
(74) Attorney, Agent, or Firm — Erickson Kernell IP, LLC (57) ABSTRACT

A spiral-wound convection battery device has flow in and out of the ends with flow proceeding through flow-permeable electrodes. In the preferred configuration electrolyte flows, reverse flows, or pressure-pulse reverse flows between an electrode and counter electrode through a flow-permeable separator. The preferred configuration is as a novel stacked-cell spiral-wound battery.

12 Claims, 5 Drawing Sheets

SPIRAL-WOUND CONVECTION BATTERY AND METHODS OF OPERATION

CROSS REFERENCE TO RELATED APPLICATIONS

This application is a continuation-in-part of application Ser. No. 13/126,971, filed Nov. 2, 2009, entitled "Convection Battery Configuration for Connective Carbon Martix," and claims the benefit of provisional application Ser. No. 61/601,106, filed Feb. 21, 2012, entitled "Spiral-Wound Convection Battery;" provisional application Ser. No. 61/702,816, filed Sep. 19, 2012, entitled "Sonic Convection-Abled Battery."

FIELD

The present invention relates to convection battery devices. More specifically, the present invention relates to an improved battery for providing higher ion fluxes between electrodes through use of flow between electrodes through a flow-permeable separator. More specifically, it relates to designs for these devices including a spiral-wound convection battery, a stacked-cell spiral-wound convection battery, and a convection battery using sonic waves to produce reverse microscopic flow.

BACKGROUND

A convection battery uses flow of electrolyte between a flow-permeable electrode and its flow-permeable counter-electrode through a flow-permeable separator to improve mass transfer. Flow between electrodes and their counter-electrodes in a battery improves ion mass transfer between the pairs. The counter-electrode is an electrode that is of opposite polarity and functionally coupled with an electrode; the counter-electrode is defined with implicit reference to an electrode with which it is paired and consistent with methods known in the art.

Improved mass transfer results in more voltage being available from the battery and more efficient use of the energy stored in the battery. Increased voltage at high current flux results in increase power both for charging and discharging. Power and power density are key performance metrics. The high limiting ion fluxes in combination with a heat exchanger in the electrolyte circulation loop allows for substantially reduced charging times for batteries.

Battery cost is an additional metric important to customers. Methods of assembling batteries impact the costs of batteries. Spiral-wound fabrication methods are recognized as being less expensive than alternative methods of manufacturing batteries. The advantage of improved mass transfer can manifest as a reduced separator surface area between electrodes with resulting thicker electrodes while keeping the limiting current the same, which reduces the costs further. Reduced current collector areas and costs, and reduced costs associated with coating the separator/membrane, also, manifest. Alternatively, higher fluxes can lead to higher limiting currents when the separator area is kept constant. This reduces charge times of a battery which is a highly favorable quality.

Higher flux batteries can be used to produce an optimal combination of higher limiting currents, reduced costs, and reduced dendrite failure susceptibility as compared to batteries without convective flow of liquid electrolyte between electrodes.

Energy density is an additional metric important to many customers. It is recognized that lithium-metal technologies that would eliminate dendrite modes of battery short-circuit in lithium chemistry batteries would have high energy densities.

The embodiments of this invention are applicable to convection batteries as well as other electrochemical devices.

SUMMARY

An aspect of the invention provides a convection battery device comprising a flow-permeable anode, a flow-permeable cathode, and a pump. The flow-permeable anode comprises an anode material, wherein the electrode has a permeability greater than 0.001 Darcy and conductivity greater than 0.005 S/m, and wherein the anode material further comprises an active anodic material. The flow-permeable cathode comprises a cathode material, wherein the packed bed has a permeability greater than 0.001 Darcy and conductivity greater than 0.005 S/m, wherein the cathode material further comprises an active cathodic material, and wherein the flow-permeable anode is electrically insulated from the flow-permeable cathode. The pump provides convection of an electrolyte between the flow-permeable anode and flow-permeable cathode.

The pump may be a sonic wave generator where the pumping action of the sonic wave generator is a reverse-flow (alternating forward and backward flow) pumping action. The waves are pressure pulse waves that cause a reverse flow through a flow-permeable separator the separates an electrode from its counter-electrode.

Yet another aspect of the invention encompasses a convection battery device comprised of at least one cell comprising a flow-permeable anode, a flow-permeable cathode, a pump, and a separator. The flow-permeable anode has an entrance surface and an exit surface, wherein the flow-permeable anode has a permeability greater than 0.001 Darcy and conductivity greater than 0.005 S/m, and wherein the anode material further comprises an active anodic material. The flow-permeable cathode has an entrance surface and an exit surface, wherein the flow-permeable cathode has a permeability greater than 0.001 Darcy and conductivity greater than 0.005 S/m, and wherein the cathode material further comprises an active cathodic material. The pump provides convection of an electrolyte between the flow-permeable anode and flow-permeable cathode. The separator is located between the flow-permeable cathode and flow-permeable anode has an entrance surface and an exit surface, wherein the separator has a permeability greater than 0.001 Darcy and conductivity less than 0.001 S/m.

A further aspect of the invention provides a convection battery cell comprised of a first electrode, a last electrode of the same polarity as the first electrode, and at least one counter-electrode located between the first electrode and the last electrode wherein (a) the counter-electrode has a polarity opposite that of the first electrode; (b) the first electrode is connected to the last electrode by an electrical conductor so they act as coupled electrode of one potential; (c) a non-conductive ion exchange separator having an attached ion molarity functionality greater than 0.05 is located between the first electrode and the counter electrode; and (d) a non-conductive counter-ion exchange separator having an attached ion molarity functionality greater than 0.05 is located between the counter electrode and the last electrode.

A further aspect of the invention is a spiral-wound configuration of electrodes and separator that allows electrolyte flow. The electrolyte flows into an electrode at the end of the spiral where it is blocked from entering the counter-electrode by a non-permeable section on the end of the counter-electrode. In the basic configuration, flow of electrolyte proceeds through the electrode, through the separator between the electrode and counter-electrode, out the other end of the counter-electrode.

The convection battery allows for novel and useful modes of operation associated with the flow of electrolyte to, from, and through electrodes. When the battery is not in use, placement of electrolyte into a storage reservoir reduces parasitic energy losses and increases battery life between charges. In instances of battery exotherm due to undesired reaction, drainage of the electrolyte from the battery can end the exotherm resulting in improved safety.

Flow may also be used to control dendrite formation. One aspect of this invention is the use of flow to eliminate dendrite modes of failures in separators which can be used to reduce battery costs and increase battery density.

The present invention relates to the manufacturing of a battery with improved ion flux due to flow of electrolyte between electrodes through a flow-permeable separator. The technology is generally applicable to battery chemistries that use the same liquid electrolyte on both sides of the separator. The separator is the non-conductive material between an electrode and its counter electrode that substantially stops the flow of free electrons between adjacent electrodes except for the flow of free electrons through an electrical circuit connected to the terminals of the electrodes.

DETAILED DESCRIPTION

Embodiments of this invention include convection battery devices, configurations of those devices, and preferred methods of operating those devices. Embodiments also include methods of using the convection battery devices.

While various embodiments of the convection battery devices, configurations of those devices, and preferred methods of operating those devices are discussed below in terms of a porous carbon matrix, other matrices having suitable properties are within the embodiments.

Spiral-Wound Convection Battery Embodiment

Figure 1:
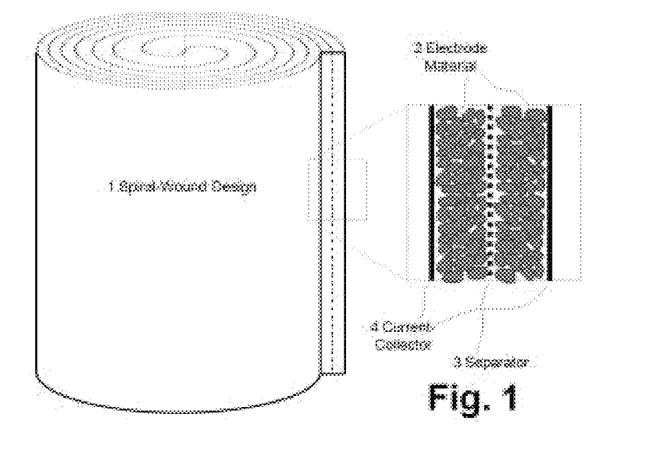
FIG. 1 is an illustration of a spiral-wound battery.
Figure 2:
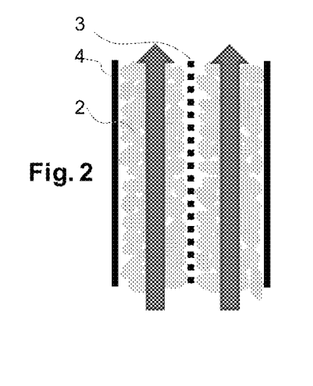
FIG. 2 is an illustration of a spiral-wound battery with porous electrodes and flow patterns where flow in input on bottom of battery.

FIG. 1 provides a schematic of a spiral-wound battery 1. Laminated sheets of a battery cell (cells) comprise the spiral-wound battery as illustrated by the expanded insert schematic where electrode materials 2 containing the active battery reagents are separated by a separator 3 that is permeable to diffusion but not to flow. Contacting the electrode materials are current collectors 4. FIG. 2 illustrates the flow pattern for the spiral-wound battery with separators that are not flow-permeable where flow is induced into one end of the battery.

FIG. 2 illustrates how liquid electrolyte flow can be induced in the axial direction with a general flow pattern parallel to the separator 3 and collector 4 surfaces. When the separator is not permeable to electrolyte flow, the flow pattern generally does not cross from an electrode to its counter-electrode.

Figure 3:
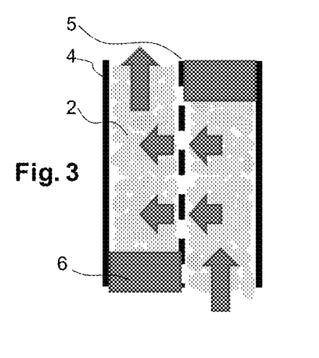
FIG. 3 is an illustration of a spiral-wound battery embodiment of this invention with porous electrodes and non-porous end section showing and flow patterns where flow in input on bottom of battery and flows from an electrode to its counter-electrode through a flow-permeable separator.

A preferred embodiment of this invention is the spiral-wound convection battery 1 with flow patterns as illustrated by of FIG. 3. This preferred convection battery includes the following three components, all of which are permeable to flow: an electrode 2A, a counter electrode 2B, and a separator 5 between the electrode and counter electrode. The electrolyte has continuous phases through the electrode, through the separator, and through the counter-electrode.

The convection battery operates with electrolyte flow between the electrode 2A and counter-electrode 2B through the separator 5. The convection battery works based on electrochemical methods known in the art for battery chemistries that are able to use the same electrolyte in the electrodes as in their counter-electrodes.

In one embodiment a pump provides convection to an electrolyte (flow of electrolyte) between the electrode and counter electrode. Table 1 provides a summary of the characteristics of various embodiments of the convection battery device 1.

TABLE 1

Summary of Defining Characteristics of Various Convection Battery Embodiments

| Property of Device | Units | Preferred | More Preferred | Most Preferred |
|---|---|---|---|---|
| Non-Conductive Separator Conductivity | S/m | | Less than 0.001 | |

TABLE 1-continued

Summary of Defining Characteristics of
Various Convection Battery Embodiments

| Property of Device | Units | Preferred | More Preferred | Most Preferred |
|---|---|---|---|---|
| Non-Conductive Separator Permeability | darcy | >0.0001 | greater than 0.001 | |
| Electrode | darcy | >0.0001 | greater than 0.02 | |
| Counter Electrode | darcy | >0.0001 | greater than 0.02 | |
| Distance Between Electrodes | mm | | 0.01 to 2 | |

A medium with a permeability of 1 darcy permits a flow of 1 cm$^3$/s of a fluid with viscosity 1 cP (1 mPa·s) under a pressure gradient of 1 atm/cm acting across an area of 1 cm$^2$. A millidarcy (md) is equal to 0.001 darcy and a microdarcy (µd) equals 0.000001 darcy. Typical values of permeability range as high as 100,000 darcy for gravel, to less than 0.01 microdarcy for granite. Sand has a permeability of approximately 1 darcy. For purposes of this invention: "permeable to flow" refers to having a permeability greater than about 0.0001 darcy and "not permeable to flow" is less than about 0.00001 darcy.

In summary, many prior-art types of diffusion, flow, and air batteries have been disclosed and are used. The convection battery is different than these because it has liquid flow directly between an electrode and its counter-electrode through a flow-permeable separator 5 that separates them. The convection battery uses the same electrolyte in an electrode as its counter electrode. The flow can be induced by a pump or the reciprocating action of a piston, diaphragm, or similar device. Having flow rather than diffusion allows for the use of thicker separators that have flow through paths that go through the separator. Advantages that can be realized include lower costs, higher energy density, higher power density, and novel modes of operation that add safety and reduce the ability of dendrite crystals to produce a path of short circuit between electrodes.

Figure 4:
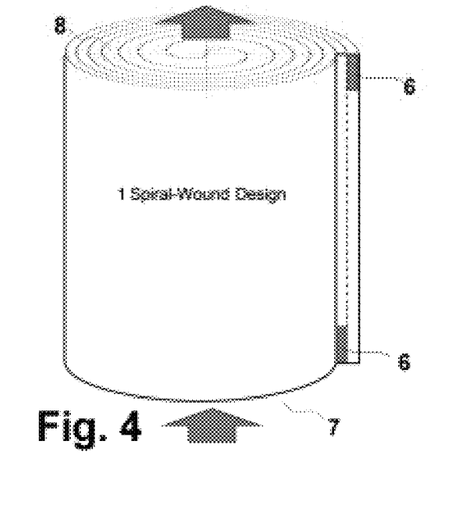
FIG. 4 is an illustration of a spiral-wound battery embodiment of this invention with porous electrodes and non-porous end section showing and flow patterns where flow in input on bottom of battery and flows from an electrode to its counter-electrode through a flow-permeable separator illustrating flow input on the bottom of the battery and output at the top of the battery.

An improved method of manufacturing the convection battery is the winding of sheets of flow-permeable packed bed electrodes 2A and 2B, flow-permeable separator 5, current collectors 4, continuous flow paths that include flow through flow-permeable media, and flow-stopping media 6 into a cylindrical spiral referred to as a spiral-wound battery. As illustrated by FIG. 3, the arrangement of these sheets is such that flow of liquid electrolyte enters at one end of the cylinder and exits at the other end with flow-stopping media substantially forcing the liquid to flow through the separator at least one time. This is illustrated by FIG. 4 where one axial end of the spiral-wound cell is the entrance end 7 and the other end is the exit end 8. It is preferred that the electrodes have higher permeabilities (higher darcy) than the separator.

Figure 5:
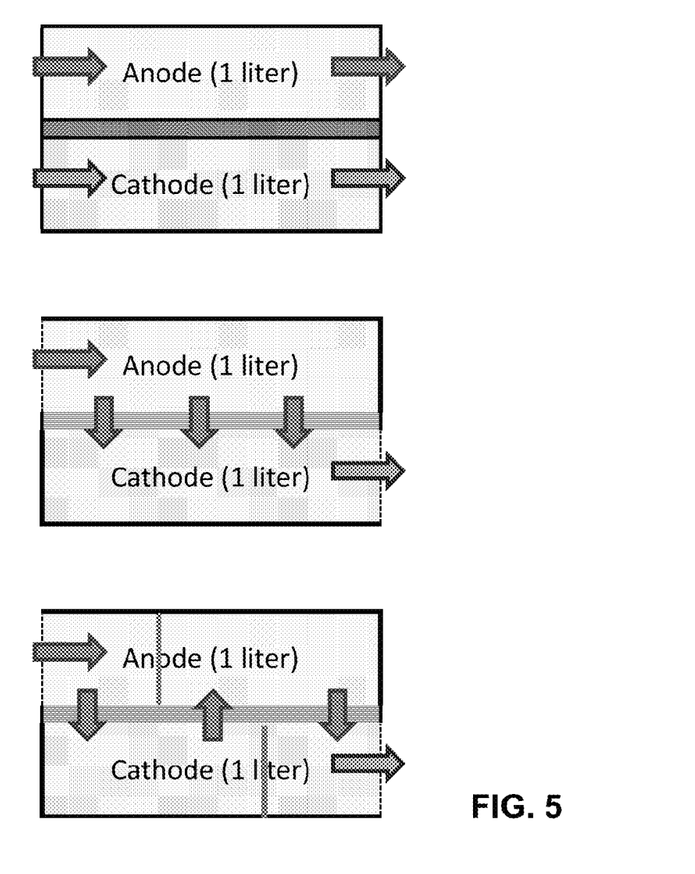
FIG. 5 is an illustration of sections of a flow-permeable electrode and flow-permeable counter-electrode with non-permeable sections (referred to as baffles) to functionally direct electrolyte flow back and forth between the electrode and counter-electrode multiple times before the electrolyte exits the cell. From left to right: flow through cell with separator that is not permeable to flow, flow through cell with flow-permeable separator, and flow through cell with baffles.

This embodiment allows the convection battery to be manufactured in a spiral configuration where flow is induced (hydrostatic pressure applied) at an entrance axial end of the spiral 7 and an exit axial end 8 that is opposite the entrance end. The flow pattern of electrolyte includes flow through a flow-permeable electrode followed by flow through a flow-permeable separator followed by flow through a flow-permeable counter-electrode. Non-permeable sections of the electrode prevent electrolyte from exiting the battery cell without flowing through the separator and counter-electrode. Multiple non-permeable sections can be used to direct flow back and forth between the electrode and counter-electrode multiple times. FIG. 5 provides an illustration of the use of multiple non-permeable sections.

An example of the preferred convection battery includes the winding of sheets of flow-permeable packed bed electrodes 2, current collectors 4, flow-permeable separators 5, and flow-stopping media 6 as a cylindrical spiral referred to as a spiral-wound convection battery.

For purposes of description, the following definitions apply: (a) permeable refers to permeable to liquid flow with a permeability generally greater than 0.001, preferably greater than 0.1 and most preferably between about 0.5 and 10 and (b) the embodiments of this invention are not limited to the specifics of this illustration but the general application of the underlying approach which is considerably broader and not limited to spiral-wound configurations. For separators less than 0.1 mm thick, the preferred permeability may be as low as 0.0001 Darcy.

FIGS. 2 and 3 are exemplifications of the laminate cell sections of the spiral battery as first illustrated by FIG. 1. FIG. 3 illustrates the key and basic embodiments of this invention, described in an electrolyte flow sequence: (a) a liquid electrolyte flows through a permeable electrode 2, (b) the liquid electrolyte then flows through a permeable separator 5 in a flow path that is forced due to an end of the permeable electrode section which is specifically a non-permeable section 6 that spans a cross section of the permeable electrode 2, and (c) the liquid electrolyte then flows through a permeable counter-electrode 2.

To prevent the flow from initiating in the counter-electrode, a non-permeable end 6 seals the counter-electrode from entering flow except as through the permeable separator 5. The electrode either has a continuously or partially open and permeable section at the entrance end 7 while the counter-electrode has a continuous non-permeable section 6 at the entrance end 7. The counter-electrode has a continuous non-permeable section 6 at the exit end 8.

The embodiments of this invention include means for winding/assembling the electrode where non-permeable sections are applied by methods known in the art during assembly. The non-permeable section could be created by applying an adhesive/polymer to the sections of the otherwise permeable electrode in a manner that reduces permeability.

Multiple cells may be contained within a spiral-wound design. The fluid flow through the spiral wound design may go in either direction, and hence, the entrance may become the exit depending upon flow direction. Also, flow may specifically be designed as reverse flow where flow is cycled as forward then backward then forward again repeating the cycle. For reverse flow, a reciprocating device may be used rather than a pump. Diaphragms that propagate the reciprocating action may be used to separate and insulate between cells.

Figure 6:
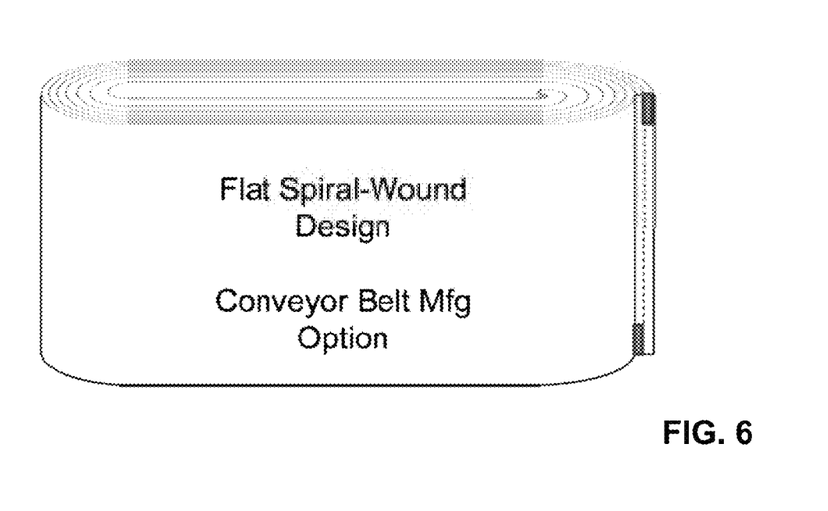
FIG. 6 is an illustration of a spiral-wound convection battery in a flattened ellipse configuration.

FIG. 6 illustrates an embodiment where multiple evenly-spaced non-permeable sections are used in a flow-permeable electrode to cause electrolyte flow to go back and forth between the electrode and counter-electrode as the electrolyte flows through the cell.

Flow-channel inducing media are preferably included in the convection battery design as part of the permeable electrodes 2 or the electrode collectors 4. The purpose of flow-channel inducing media is to distribute flow of liquid electrolyte evenly through the electrode.

The spiral-wound configuration of FIG. 1 is not limited to utilization with batteries. A spiral-wound convection electrochemical device having a plurality of layers in a spiral configuration comprising: an anode electrode layer that is permeable to flow, a cathode electrode layer that is permeable to flow, a separator layer between the anode and cathode electrode layers, a circumference surface that is not permeable to flow, and two ends that are permeable to flow and functionally allow an electrolyte to enter the device and flow through the anode and cathode. The electrochemical device may be further defined as comprising: current collector layers adjacent to each electrode on the electrode surfaces opposite the electrode surfaces next to the separator whereby the current collector layers are not permeable to flow. Also, the electrochemical device is preferably a secondary battery.

Third Electrode Embodiment

Figure 7:
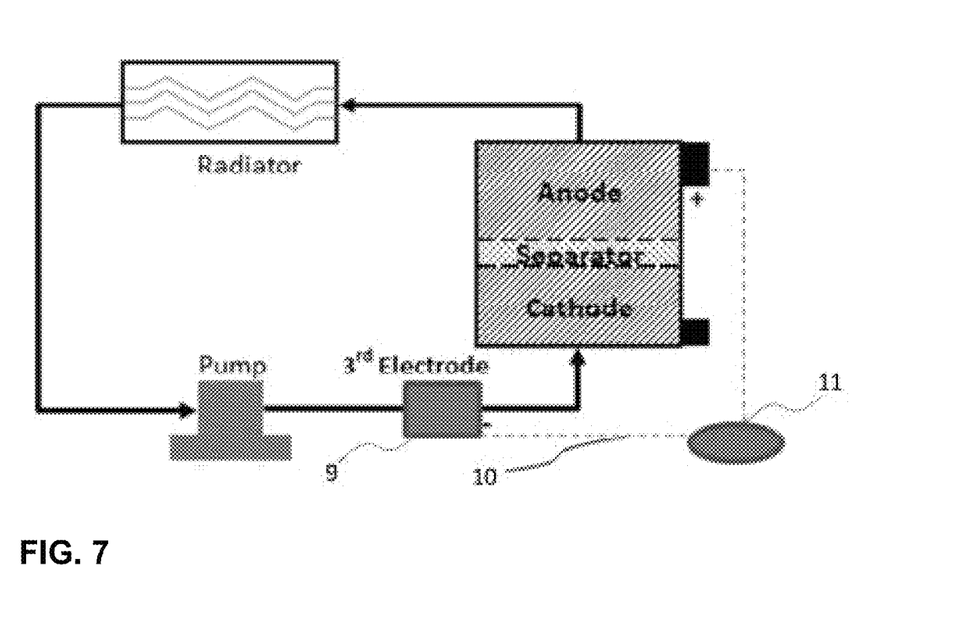
FIG. 7 is an illustration of an example convection battery embodiment with a third electrode connected in an electrical circuit to the anode (battery discharge mode) of the convection battery.

Referring to FIG. 7, in a convection battery with flow-permeable electrode, flow-permeable counter-electrode, and a flow-permeable separator; this embodiment uses the electrolyte flow to load active material (initially or as a method to regenerate an electrode) from a third electrode 9. The third electrode is most preferably a metallic housing that contains lithium as an active material. The regeneration includes (a) loading of desired reagent into the third electrode, (b) pumping of electrolyte through the third electrode and the electrode being loaded or regenerated, (c) completion of the electrical circuit 10 in a method known in the art to transfer the desired material to the electrode.

For exemplary purposes, consider a Li:S convection battery in which lithium has reacted with the solvent and hence the battery is low on active material lithium. Preferably the battery is discharged to transfer all (but less than stoichiometric) lithium to the sulfur cathode. A canister of lithium is then connected into the electrolyte loop in which the pump circulates in the following manner: (a) such that there is a relatively continuous path of electrolyte from the lithium in the canister to the sulfur cathode (b) a conductive wire connects the sulfur cathode to the conductive lithium canister, and (c) additional design precautions are in place to secure a connective and conductive path from the surface of the cathode through the conductive wire and to the lithium surface with insulation from short circuit. Next, the pump is turned on whereby the lithium in the canister converts to lithium cat ions and transfers to the sulfur cathode surface until such time that the sulfur sites are consumed and the voltage force driving the reaction ceases. A direct current power source 11 can be used to facilitate the transfer of lithium from the third electrode 9 to the one of the battery electrodes as needed. Finally, the canister is removed from the circulation loop of the convection battery along with auxiliary hardware. The convection battery is charged with both the old and newly-loaded lithium transferring to the lithium anode to create a battery with a higher state of charge.

This approach can be used to build a battery without one or more active reagents and then to load the active reagents later. For example, a spiral wound lithium-sulfur battery could be built without the lithium in the battery. Then, in a moisture-free liquid loop (inside tubing, pump head, and battery); the lithium could be loaded. This allows battery assembly of lithium batteries outside a dry room and allows for some modes of regenerating lost capacity in batteries.

Embodiments of this invention that use a third electrode to load material into the battery transfer mass to the battery. These embodiments are a method of adding mass to the electrodes of a secondary convection battery device comprising: an electrolyte reservoir that is functionally connected in series with the pump and a convection battery to allow electrolyte flow between the electrochemical device and the reservoir, a control method including the ability to drain electrolyte from the convection battery into the reservoir, and a control method including the ability to pump electrolyte from the reservoir into the convection battery and to maintain the electrolyte in the convection battery.

Stacked Spiral-Wound Battery Embodiment

A convection battery in a spiral-wound configuration uses non-permeable sections in electrodes to block or direct flow. Electrolyte is pumped into one end 7 of the spiral-wound configuration, flows through a flow-permeable separator at least once, and exits the other end 8 having passed through both electrodes.

The spiral consists of laminated sheets. Spiral-wound batteries are produced by rolling a lamination of different functional sheets into a spiral. The designs and functionalities defined in the sheets are transformed into a spiral configuration with an overall cylindrical appearance.

Optionally, multiple cells may be stacked in a spiral-wound configuration where each cell consists of: an electrode, its counter-electrode, a separator between electrodes, and conductor surfaces that sandwich these three.

Figure 8:
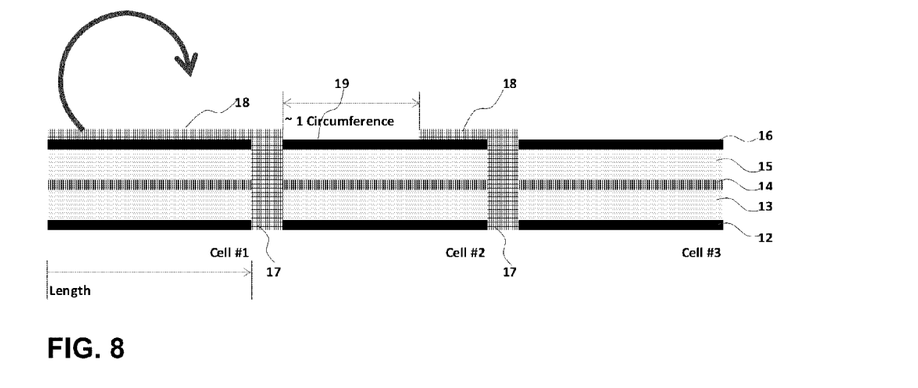
FIG. 8 is an illustration of an example layering of electrodes, separator, and insulation for a stacked-cell spiral-wound embodiment of this invention where the layering illustration is prior to winding into spiral configuration.

FIG. 8 illustrates the laminated sheets of an example stacked-cell spiral-wound battery configuration. A direction for rolling the spiral is illustrated. For this example, the following sequence is followed for functional layers from outside to inside the spiral: an outer conductor 12, an anode 13, a flow-permeable separator 14, a cathode 15, and an inner conductor 16. Insulating inserts 17 are needed along the lengths of the laminated sheets to prevent short circuit of the anode of cell #1 with the anode of cell #2 or the cathode of cell #1 with the cathode of cell #2.

An electrical insulation layer is placed on top (before rolling) of the upper conductor as necessary to prevent a short circuit from the outer conductor 12 to the inner conductor 16 of the same cell.

When the sheets are turned into a spiral the radius continuously increases. Depending on the radius during the rolling process and the length of the sheet (see FIG. 6), the outer conductor 12 may be placed adjacent to the inner conductor of the same cell 16 or the inner conductor of the next cell in the series. When the outer conductor 12 is adjacent to the inner conductor 16 of the same cell, an insulation layer is placed between the conductors to prevent short circuit. When the outer conductor 12 is adjacent to the inner conductor 16 of the next cell in series along the length dimension, an insulation layer is not required between the conductor; more preferred; is that the conductor layers contact each other; most preferred is that the two conductor layers are replaced with a single bipolar surface layer where electrons pass through the surface of the conductor from one cell to the next cell in series. For bipolar surfaces, one sheet of current collector serves two cells with the advantage that the amount of current collector needed for the functional battery is reduced.

FIG. 8 illustrates the laminate layers of this stacked-cell configuration. The ~1-circumference section 19 of conductor is the location of a shared sheet of conductor between (in this case) the anode of cell 1 with the cathode of cell 2 (generally the anode of cell n with the cathode of cell n+1). The insulation layer prevents direct contact of the anode of cell n with the cathode of cell n.

Spiral-winding battery-forming methods are not limited to cylindrical geometries. The rolling process illustrated by FIG. 8 could be performed about a flat surface such as a board with rounded edges whereby the final battery would not be a cylinder with circular ends; but rather, the outward appearance would be characterized as a flattened cylinder (ellipse-shaped ends). An optimal geometry for a flattened-cylinder spiral-wound battery would have cell lengths that are approximately equal to the circumference.

One method of preparing a spiral-wound battery is to roll laminated sheets of electrodes, separators, and current electors around a rod. For example purposes, the rod may have a height of 30 cm and a radius of 5 cm with a resulting spiral-wound battery having a height of 30 cm and radius of 15 cm. As an alternative example, the laminated sheets may be rolled around a board that is 30 cm in height, 1 cm thick, and 15 cm wide with the resulting spiral-wound battery having a height of 30 cm, thickness of 11 cm and width of 25 cm. The spiral formed by rolling around the board would be characterized as a flatted ellipse cylinder.

The stacked-cell spiral-wound configuration includes tubing to facilitate pumping into each separate cell where tubing is at least 1 cm in length. By example, the tubing is inserted into the electrode of each cell at the entrance end 7. The discharge end optionally uses tubing to direct fluid back to a reservoir that is connected to the pump. Optionally, when the battery is not in use, the tubes are drained of liquid electrolyte in a manner that eliminates a direct path of electrolyte between cells. Optionally, as a method to augment a non-continuous path of electrolyte between cells, a non-conductive (e.g., plastic) rotary distributor may be used to direct electrolyte into individual cells separately. Optionally, the discharge end of the spiral-wound battery cylinder may have electrolyte drain from the end to an air gap that perpetually creates a non-conductive liquid electrolyte phase between cells.

The flattened ellipse design becomes a parallel plate design with an electrolyte entrance end 7, an electrolyte exit end 8, and sides that are not permeable to flow. The stacked layers include an outer conductor 12, an anode 13, a flow-permeable separator 14, a cathode 15, and an inner conductor 16 where the adjacent cells may share a bipolar place conductor. The embodiments of this invention are not limited to spiral embodiments. The stacked plate embodiments include the use of non-permeable flow-stopping media 6 to direct electrolyte from end to end while passing through the electrode, separator 14, and counter electrode at least once.

In summary, this embodiment is a spiral-wound convection battery in spiral-wound configuration where non-permeable sections in electrodes block flow in an otherwise permeable set of electrodes with separators in such a manner that electrolyte is pumped in one end of the spiral-wound configuration and exits the other end while passing through both electrodes. The spiral consists of laminated sheets has multiple cells where: (a) each cell consists of sheets of electrode, its counter-electrode, a separator between the electrodes (the electrode and its counter electrode), conductor on outside of the electrode, conductor on outside of counter-electrode, and insulator on the outside of at least parts of one conductor, (b) a spiral winding of these sheets where the two conductor sheets of the same cell are not put in electrical contact through use of an insulating sheet as necessary, and (b) when two different cells are adjacent in the spiral configuration a counter-electrode the electrode of the other cell are on opposite sides of the same conductor sheet.

Optionally, as a method to augment a non-continuous path of electrolyte between cells, non-conductive (e.g., plastic) check valves may be placed in the tubes the introduce electrolyte separately into each cell.

Sonic Enhanced Convection Battery Embodiment

In a convection battery with flow-permeable separators between electrodes, flow of electrolyte through the electrode becomes increasingly difficult in very thin electrodes. This embodiment is on a battery where mixing/diffusion is enhanced through pressure waves (sonic waves or rapidly pulsing flow). Preferably, the battery is a stacked-cell convection battery with flow-permeable separators between electrodes which is connected with a flow pulse (sonic) generator that sends waves through the cell.

Figure 9:
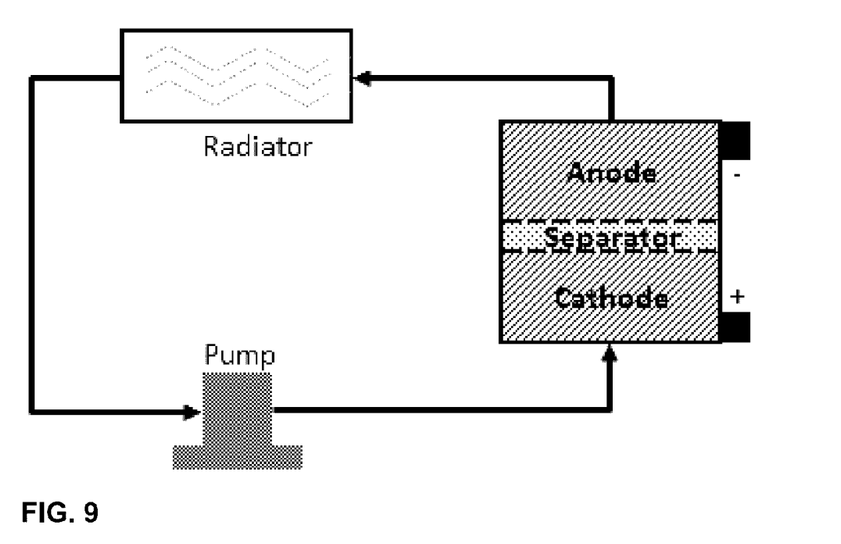
FIG. 9 is an illustration of an example convection battery embodiment with a heat exchanger in the electrolyte circulation loop.
Figure 10:
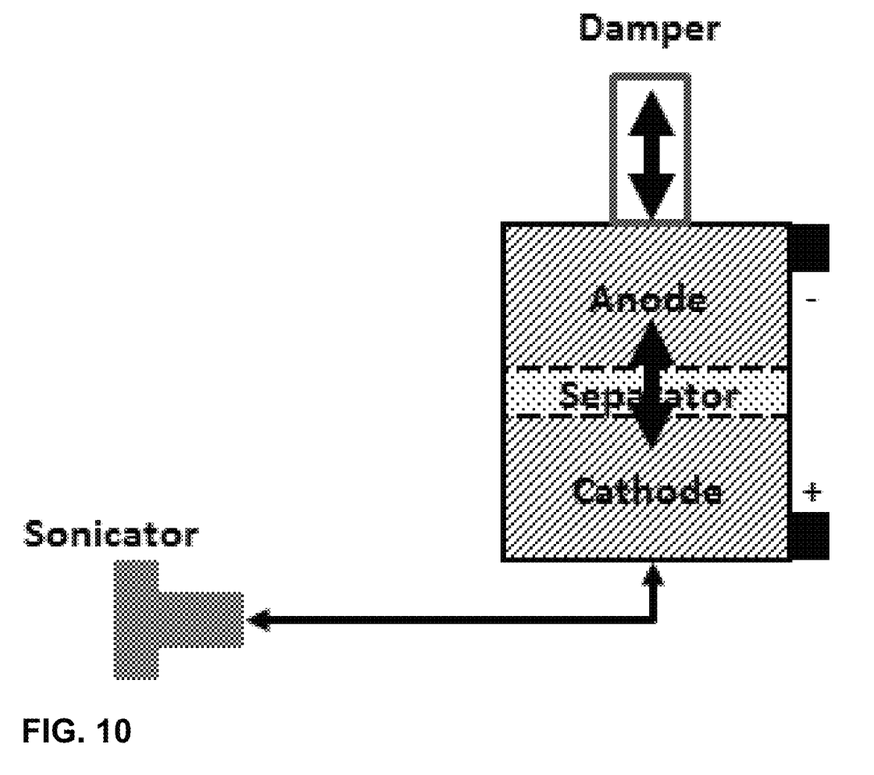
FIG. 10 is an illustration of an example convection battery embodiment with a sonic generator alternative to a pump.

FIG. 9 illustrates the convection battery with a pump for circulation. FIG. 10 illustrates the convection battery with fluid flow generated by sonic energy (sound waves through water, also recognizes as pressure pulses through water). The sonic-enhanced battery most-preferred embodiment includes flow-permeable electrodes and separators (between each electrode and its counter-electrode), a flow path that would allow a reverse-flow action through both electrodes and the separator, a sonicator that generates pressure pulses in the electrolyte and is connected to the entrance of the convection battery, and a damper at the exit of the convection battery to allow pressure pulses to complete their path through the convection battery. An example frequency is 50 kHz.

In a convection battery with flow-permeable separators between electrodes, flow of electrolyte through the electrode becomes increasingly difficult in very thin electrodes. This embodiment is on a battery where mixing/diffusion is enhanced through pressure waves (sonic waves or rapidly pulsing flow). Preferably, the battery is a stacked-cell convection battery with flow-permeable separators between electrodes and their counter electrodes which is connected with a flow pulse (sonic) generator that sends waves through the cell. Enhancement is likely and possible with separators of more-conventional design-that are not flow permeable.

Modes of Operation

The convection battery uses flow of electrolyte through the battery to enhance performance.

One type of enhanced performance is reduced mass transfer over-potentials; and specifically, reduced diffusion over-potentials. At low current fluxes when diffusion over-potentials are low without pumping of electrolyte, the preferred embodiments of this invention would not operate the pump.

Another method to enhance performance is to avoid using the battery energy to power the pump when possible. When charging a battery, it is preferred to power the pump with the same energy source as used to charge the battery.

Another method to enhance performance is to drain the battery of electrolyte when not in use. Draining the battery of electrolyte will reduce parasitic losses of stored energy. Many parasitic loss methods involve flow of ions through electrolyte; if the electrolyte is removed from the battery these routes of parasitic losses are reduced. In preferred embodiments, the draining of electrolyte and refilling of electrolyte by the pump is part of the automated control methodology.

Another method to enhance performance is to stop electrolyte flow or drain electrolyte from the battery as a means to reduce reaction rates. This can be used as a safety-shutdown in events of short circuit. Removal of electrolyte from a battery in a short-circuit situation can substantially reduce the hazards associated with the short circuit.

Another method to enhance performance is to operate in a manner that eliminates formation of dendrites in the separator. When lithium metal dendrites form in separators, the dendrites can cause a short circuit. The convection battery of FIG. 9 illustrates the separator between electrodes and uses tubing to connect the pump to the battery. For batteries based on lithium chemistry, the current delivered by the battery is proportional to the net amount of lithium cat ions transferred from the anode to the cathode. In a convection battery, the mass balance of the transfer of reactive ions (e.g., lithium cat ions) is substantially closed based on the volumetric flow rate of electrolyte times the absolute value of the concentration difference of lithium cat ions between the separator and tubing. This translates to the condition that the lithium cation concentration in either the separator or the tubing must be less than the average concentration of lithium cat ions in the entire system. Depending upon the direction of electrolyte flow the reactive ion concentration in the separator may be less than or greater than the average concentration of reactive ion in the electrolyte. When charging a lithium battery the preferred electrolyte flow direction is that direction that leads to a lower concentration of lithium cat ions in the separator than in the tubing. This results in a lower lithium cation in the separator and prevents dendrite formation in the separator.

More specifically, for a convection battery with a lithium (or lithium-plated) electrode and its counter-electrode. Charging occurs with fluid sequentially through a) the electrode to, b) the separator to, c) the counter-electrode to, d) the flow channel (tubing) with pump and back to, e) the electrode.

In an embodiment, the battery electrode composition may include a chemically active material attached to the porous carbon matrix. Suitable chemically active materials may be selected from any electrochemically active material known in the art, including but not limited to an active anodic material and an active cathodic material.

Non-limiting examples of active anodic materials include a metal selected from lithium, zinc, lead, magnesium, manganese, aluminum, and combinations thereof. Non-limiting examples of active cathodic materials include lithium oxide, zinc oxide, lead oxide, magnesium oxide, manganese oxide, aluminum oxide, cobalt oxide, vanadium oxide, titanium sulfate, molybdenum oxide, iron phosphate and combinations thereof.

In one embodiment, the amount of chemically active material attached to the porous carbon matrix is greater than 0.25 cc of chemically active material for every gram of porous carbon matrix, where the loading of the chemically active material is expressed on a gram basis of carbon material free from the active material. Using the density of the chemically active material, these specific volumes of chemically active material may be readily converted to mass fractions of chemically active material.

The intercalated graphite of existing lithium-ion batteries typically have a carbon:Li (C:Li) ratio of about 6:1 or greater. In a fully charged state, an embodiment of the convection battery has a C:Li ratio of less than 6:1, another embodiment has less than 3:1, and an exemplary embodiment less than 1.5:1. This translates to metal-on-metal loading of the carbon after the first layer of lithium is on the carbon. This C:Li ratio may be generally extended to loadings of other metals. Embodiments of this invention that prevent dendrite formation in separators can be used to advantage to decrease the C:Li ratios in lithium electrode.

In another embodiment, the amount of chemically active material attached to the porous carbon matrix ranges from about 0.5 cc to about 4.0 cc of chemically active material for every gram of porous carbon matrix. In an exemplary embodiment, the amount of chemically active material attached to the porous carbon matrix ranges from about 0.75 cc to about 3.0 cc of chemically active material for every gram of porous carbon matrix.

Electroplating Method

Another method of loading a chemically active material onto the porous carbon matrix is an electroplating method. This method may be particularly suitable for use as a commercial process for battery electrode material preparation, especially for an approach in which carbon is put into the battery electrode configuration prior to plating. One embodiment of the electroplating method includes electroplating granular porous carbon matrix in bulk prior to putting the battery electrode material into the battery electrode configuration. An exemplary approach is to take a larger vessel that is >5 gallons, or >50 gallons in another embodiment, or >500 gallons in an exemplary embodiment, and to pack that vessel with the porous carbon matrix that is to be plated. Using methods well-known in the art, the granular porous carbon matrix is compacted in the vessel to provide electrical connectivity through the entirety of the porous carbon matrix bed. Pipes containing non-conductive sections connect the vessel to a second vessel containing the metal that is to be plated onto the carbon. The second vessel may be smaller, but no size constraints are placed on the second vessel. A continuous phase of solvent/electrolyte occupies both vessels and the pipes. An electric circuit connects the metal in the second vessel to the carbon through a voltage sources such that no current flows in this circuit at steady state when no solvent/electrolyte is present. An application of voltage pulls electrons from the metal in the smaller vessel and directs the electrons on the carbon in the larger vessel when solvent/electrolyte is in place. This provides a bulk electroplating of the carbon in the larger vessel. Circulation of fluid by the pump greatly expedites the electroplating process by enhancing the mass transfer of ions through solution.

The larger vessel has an entrance, exit, and screening means so that liquid flows with about the same contact with all carbon. In the batch mode, screens hold the carbon in the vessel, but other methods known in the art may be used to create a moving bed system that produces results similar to a batch system embodiment.

A metal that has been loaded on the anodic material may be further oxidized to produce a cathodic material. By way of non-limiting example, lead may be oxidized to lead sulfate with sulfuric acid and the resulting lead sulfate may be further oxidized to lead oxide by electrochemical oxidation to form a cathode material for a lead-acid battery device. This approach may require an oxidizing co-reagent.

An alternative approach for producing a cathodic material is to chemically oxidize the metal on the anodic material. By way of a non-limiting example, iron may be plated onto the electrode material using the methods described above and the iron may then be oxidized by contacting the iron with acids including but not limited to phosphoric acid or sulfuric acid. In this illustrative example, hydrogen is evolved and a salt that includes iron in an oxidized state forms, at least in part, in place of the iron metal.

Yet another alternative approach is to perform electrolysis of a salt such that the anion of the salt in solution is deposited onto the cathode material. In some instances, a salt with more than one element of metal per compound disassociates such that the one metal becomes a cation and is plated onto the anode while the other metal is part of an anionic complex that is plated onto the cathode.

Convection Battery Device

In one embodiment, a convection battery device includes a flow-permeable anode of anode material, a flow-permeable cathode of cathode material, and a pump that provides convection of an electrolyte between the flow-permeable cathode and the flow-permeable anode. Various embodiments of the convection battery device use convective flow of electrolyte through the anode and cathode to allow large flow-permeable beds to replace prior battery designs that included multiple layers of separators and thin electrodes. The convection of the electrolyte supplements the diffusive ion transport mechanisms in the flow-permeable anode and the flow-permeable cathode, significantly enhancing overall battery performance.

A convection battery is comprised of: a) a flow-permeable anode, b) a flow-permeable separator, c) a flow-permeable cathode, and d) a method to enhance mass transfer such a pumping of electrolyte between the anode and cathode. Details of completing the exemplary battery are common and known in the art.

Overview of Convection Battery Device

An exemplary embodiment of the convection battery device includes a flow-permeable anode, a flow-permeable cathode, and a pump. The flow-permeable anode includes an anode material and the flow-permeable cathode includes a cathode material. The anode material functions as the anode of the convection battery device, serving as an electron source during the discharging of the convection battery device and absorbing electrons during the recharging of the convection battery device. Similarly, the cathode material functions as the cathode of the convection battery device, absorbing electrons during the discharging of the convection battery device and serving as an electron source during the recharging of the convection battery device.

The pump provides convection to an electrolyte between the flow-permeable anode and the flow-permeable cathode. The convection of the electrolyte supplements the diffusive ion-exchange mechanisms used by the convection battery device during the discharging and recharging of the device, thereby enhancing the overall performance of the device. Most battery chemistries known in the art are suitable for use in the embodiments of the convection battery device.

The flow-permeable anode and the flow-permeable cathode are optionally separated by a non-conductive separator, which prevents the occurrence of electrical discharges between the flow-permeable anode and the flow-permeable cathode. In addition, the material of the separator is porous, so that an electrolyte may pass from the flow-permeable anode through the non-conductive packing and into the flow-permeable cathode.

The flow-permeable anode is encased by a conductive anode wall, which also functions as an anode current collection element to collect the electrical current from the flow-permeable anode during the discharge and recharging of the device. Similarly, the flow-permeable cathode is encased by a conductive cathode wall that also functions as a cathode current collection element to collect the electrical current from the flow-permeable cathode during the discharge and recharging of the device. The current collection elements and facilitate reduced resistance in collecting electrons from the active materials in the anode and flow-permeable cathodes and respectively. The separator is encased by a non-conductive separator wall 120 that electrically isolates the anode wall and the cathode wall.

The convection battery device further includes a negative electrical terminal 126 electrically connected to the anode current collection element, and a positive electrical terminal electrically connected to the cathode current collection element.

Materials and properties of the elements of the exemplary embodiment described above, as well as additional alternative embodiments, are described in detail below.

Flow-Permeable Anode

The anode material included in the flow-permeable anode includes a plurality of anode granules and an active anodic material. In one embodiment, the plurality of anode granules possess material properties that are similar to the porous carbon matrix granules described above, and the active anodic material is a plurality of discrete reactive anodic granules that are dispersed among the anode granules. In this embodiment, each of the reactive anodic granules are formed into an external shape including, but not limited to a strip, a wire, a filament, a sphere, a shaving, an irregular granule, a filing, and combinations thereof.

In another embodiment, the active anodic material is attached to the anode granules using any of the methods described above. The amount of active anodic material attached to each of the anode granules is greater than 0.25 cc of active anodic material for every gram of anode granules in on embodiment, ranging from about 0.5 cc to about 4.0 cc per gram of anode granules in another embodiment, and ranging from about 0.75 cc to about 3.0 cc in an exemplary embodiment. Non-limiting examples of suitable active anodic materials include a metal selected from lithium, zinc, lead, magnesium, manganese, aluminum, and combinations thereof.

The anode material is selected to be adequately porous to allow the flow of electrolyte through the flow-permeable anode, to contain active anode materials and to allow for electrical connectivity. An illustrative example of an anode material is a mixture of lithium metal with activated carbon. Most anode materials will work provided the packed-bed material specifications are met.

The flow-permeable anode may be optionally compressed by a compressive force that is greater than 100 kPa in one embodiment, greater than about 300 kPa in another embodiment, and ranging from about 500 kPa to about 1000 kPa in an exemplary embodiment, in order to enhance the electrochemical reactivity of the flow-permeable anode. In these embodiments, the material properties of flow-permeable anode further include a compressive strength that is higher than the applied compressive force.

In an exemplary embodiment of a convective battery device having a capacity of greater than about one kW-hour, the flow-permeable anode contains greater than one kg of anode material.

Flow-Permeable Cathode

The cathode material included in the flow-permeable cathode includes a plurality of cathode granules and an active cathodic material. In one embodiment, the plurality of cathode granules possess material properties that are similar to the porous carbon matrix granules described above, and the active cathodic material is a plurality of discrete reactive cathodic granules that are dispersed among the cathode granules. In this embodiment, each of the reactive cathodic granules are formed into an external shape including, but not limited to a strip, a wire, a filament, a sphere, a shaving, an irregular granule, a filing, and combinations thereof.

In another embodiment, the active cathodic material is attached to the cathode granules using any of the methods described above. The amount of active cathodic material attached to each of the cathode granules is greater than 0.25 cc of active cathodic material for every gram of cathode granules in on embodiment, ranging from about 0.5 cc to about 4.0 cc per gram of cathode granules in another embodiment, and ranging from about 0.75 cc to about 3.0 cc for every gram of cathode granules in an exemplary embodiment. Non-limiting examples of suitable active cathodic materials include lithium oxide, zinc oxide, lead oxide, magnesium oxide, manganese oxide, aluminum oxide, cobalt oxide, vanadium oxide, titanium sulfate, molybdenum oxide, iron phosphate and combinations thereof.

The cathode material is selected to be adequately porous to allow the flow of electrolyte through the flow-permeable cathode, to contain active cathode materials and to allow for electrical connectivity. A non-limiting example of a cathode material is iron phosphate with activated carbon. Most cathode materials will work provided the packed-bed material specifications are met.

The flow-permeable cathode may be optionally compressed by a compressive force that is greater than 100 kPa in one embodiment, greater than about 300 kPa in another embodiment, and ranging from about 500 kPa to about 1000 kPa in an exemplary embodiment, in order to enhance the electrochemical reactivity of the flow-permeable cathode. In these embodiments, the material properties of flow-permeable cathode further include a compressive strength that is higher than the applied compressive force.

In an exemplary embodiment of a convective battery device having a capacity of greater than about one kW-hour, the flow-permeable cathode contains greater than one kg of cathode material.

Separator

In one embodiment, the flow-permeable anode and the flow-permeable cathode are electrically insulated from each other by the separator. In this embodiment, the separator includes a non-conductive packing material which has sufficient filtering capabilities at a depth of about 5 mm to keep the anode material and the cathode material physically separated, while allowing electrolyte to flow freely through the separator.

In various embodiments, the separator defines a separation between the surfaces. As used herein, the separation between the surfaces is defined as the length of the flow path of electrolyte from the flow-permeable anode to the flow-permeable cathode. In one embodiment, the separator defines a separation between the surfaces of greater than 0.1 mm in one embodiment, from about 2 mm to about 20 mm in another embodiment, and from about 2 mm to about 10 mm in an exemplary embodiment.

One reason that the spacing between the surfaces is important, without being bound to any particular theory, is that the space between electrodes must facilitate a flow of fluid that has a net charge. As a non-limiting example, in the zinc-alkali battery a net flow of hydroxide ions must flow from the cathode to the anode through the non-conductive separator. The flow of charges between electrodes is facilitated by counter-ions exhibiting a zero to near-zero net flow between electrodes. In a diffusion cell, the counter-ions are stationary from a bulk flow perspective. In a convection cell, the counter-ions must maintain a zero to near-zero net flow relative to the electrode entrance/exit surfaces, and to attain this the counter-ions must undergo a diffusion mass transfer against the flow of electrolyte, assuming the counter-ions are soluble in the electrolyte. Shorter separation between the flow-permeable anode and the flow-permeable cathode imparts greater driving force for this diffusion against the flow of electrolyte which leads to higher diffusion rates and better battery performance.

In another embodiment, the separation of the surfaces created by the non-conductive packing material provides a safety margin against discharge. Illustrative examples discussed in detail below illustrate how the distance between the flow-permeable anode and the flow-permeable cathode impacts performance with reduced spaces between the electrode beds leading to improved performance.

In general, the properties of the separator are the bulk properties of that bed. In some embodiments, the non-conductive separator may have conductive particles including but not limited to steel shot so long as there is a corresponding nonconductive component including but not limited to glass wool that prevents the overall electrical connectivity of the conductive particles.

An exemplary embodiment of the separator includes non-conductive packing material having a conductivity of less than 0.001 S/m and a permeability similar to that of the anode material and cathode material. Further, in an embodiment, the non-conductive packing material should possess sufficient compressive strength to withstand the magnitudes of compressive forces that enhance the connectivity of the flow-permeable anode and the flow-permeable cathode.

Non-limiting examples of suitable materials included in the separator include crushed ceramic material, glass wool, and ion exchange media, and combinations thereof. In an embodiment stationary counter-ions are included in the separator which may be attained through use of materials including but not limited to an ion exchange material. In an exemplary embodiment, the separator includes an ion exchange media capable of at least partially countering any charge the electrolyte contains as it convects from the flow-permeable anode to the flow-permeable cathode or from the flow-permeable cathode to the flow-permeable anode.

The ion exchange media may be characterized by the density of attached ions and the strength of the sites of these ions. Both of these properties may be assessed by titration methods known in the art. Through the use of bulk density, the density of sites may be converted to units of moles per liter (molarity). The pKa measurement depends upon the solvent used. In various embodiments the pKa solvent is the electrolyte solvent in which the ion exchange material is used.

The pKa of the ion exchange media included in the separator where the separator is situated after the flow-permeable cathode ranges from about −2 to about 14 in one embodiment, from about 4-12 in another embodiment, and from about 7-12 in an exemplary embodiment. For those embodiments in which the separator is situated after the flow-permeable anode, the pKa of the ion exchange media included in the separator ranges from about −2 to about 14 in one embodiment, from about 0 to about 10 in another embodiment, and from about 0 to about 7 in an exemplary embodiment.

In an embodiment, the ion exchange media facilitates the flow of liquids with net charges. Just as the flow of these charged liquids is necessary between counter-electrodes, flow of charged liquids is also necessary within electrodes. The ion exchange properties of the flow-permeable anode and flow-permeable cathode materials are discussed in detail below.

Electrolyte

The electrolyte has a mole fraction of ions ranging from about 0.02 to about 1.0 in one embodiment, from about 0.1 to about 0.7 in another embodiment, and from about 0.25 to about 0.5 in an exemplary embodiment. The embodiments of electrolytes include, but are not limited to various battery electrolytes known in the art [Any specific electrolytes to list?]. In addition, any specific battery electrolyte composition used in a convective battery device is selected to be compatible with the chemical composition of flow-permeable anode and the flow-permeable cathode.

Use of an electrolyte storage reservoir, piping, and control method that allows draining of the electrolyte into the reservoir allows for methods of reducing parasitic losses and battery shutdown as a safety feature.

Prevention of Dendrite Formation

Dendrite formation, a major limitation for the use of metals including but not limited to lithium metal as a rechargeable material is avoided by a number of mechanisms in various embodiments. In one embodiment, a relatively large distance between the flow-permeable anode and the flow-permeable cathode limits the ability of dendrites to short-circuit the device. In another embodiment, periodic reversal of the direction of the convection of electrolyte causes any dendrite material formed to dissolve before becoming too large. In another embodiment, if dendrite needles form and break off, the packed bed configuration in which the flow-permeable beds are under significant compressive force to increase contact and conductivity within the flow-permeable beds allows for new areas of electrical contact to be established and for the lithium dendrites to once again become part of the electrode network. In still another embodiment, periodic full discharge may be used to totally dissolve any dendrite formed and to prevent the cumulative growth that may occur over repeated usage.

In yet another embodiment, the flow-permeable anode has sections of different average voltage where the voltage difference, defined herein as the difference between the anode voltage and the cathode voltage, is less for the anode section adjacent to the flow-permeable cathode than for a region of the flow-permeable anode further from the flow-permeable cathode. This lower voltage difference is consistent and functionally important for charging the device where a lower voltage difference corresponds to a lower charging rate and a lower tendency to form dendrite crystals.

In one non-limiting example, for a lithium battery having a zero-load voltage about 3.5 volts, voltage differences may be 0 V for the flow-permeable cathode, −3.7 V for the portions of the anode further from the cathode, and −3.55 V for the anode section closer to the flow-permeable cathode. A lower voltage and lower lithium cat ion concentration exists adjacent to the flow-permeable cathode, but are separated by the separator so as to minimize dendrite formation, which eliminates dendrite-based battery failure modes.

An embodiment includes the negative electrical terminal on the anode section further from the flow-permeable cathode, and a non-conductive containment wall connecting the anode section further from the flow-permeable cathode to the anode section closer to the flow-permeable cathode. A resistor provides a path of electrical conductivity between the two anode sections.

Optionally, the separator may include a rotating device (not shown) constructed is a material having a conductivity of less than 0.001 S/m, including but not limited to a serrated disk of plastic, that passes through the path of electrolyte flow and physically disrupts any dendrites that may be growing between the flow-permeable anode and the flow-permeable cathode.

The design features of various embodiments described above directed to the prevention of dendrite formation overcome historically difficult obstacles limiting the use of lithium metal in anodes. An exemplary embodiment is a lithium convection battery that includes has excess cathode material, allowing the lithium in the flow-permeable anode to be fully dissolved and thereby fully remove any dendrite formed.

Defining Characteristics of Convection Battery Devices

Table 2 provides a final summary of the characteristics of various embodiments of the convection battery device described above.

TABLE 2

| | Summary of Defining Characteristics of Various Convection Battery Embodiments | | | |
|---|---|---|---|---|
| Property of Device | Units | Preferred | More Preferred | Most Preferred |
| Compressive Force on Packed-Bed | kPa | >100 | >300 | 500–1,000 |
| Non-Conductive Separator Conductivity | S/m | | Less than 0.001 | |
| Non-Conductive Separator Permeability | darcy | | greater than 0.02 | |
| separator Ion Exchange Bed After Cathode | pKa | −2 to 14 | 4–12 | 7–12 |

TABLE 2-continued

Summary of Defining Characteristics of
Various Convection Battery Embodiments

| Property of Device | Units | Preferred | More Preferred | Most Preferred |
|---|---|---|---|---|
| separator Ion Exchange Bed After Anode | pKa | −2 to 14 | 0-10 | 0-7 |
| separator Ion Site | Molarity | >0.1 | 0.2-5 | 0.4-2 |
| Anode Bed Ion Exchange | pKa | −2 to 14 | 0-12 | |
| Anode Bed Ion Site | Molarity | >0.05 | 0.1-2 | 0.4-2 |
| Flow-permeable cathode Ion Exchange | pKa | −2 to 14 | 0-12 | |
| Flow-permeable cathode Ion Site | Molarity | >0.05 | 0.1-2 | 0.4-2 |
| Electrolyte | Mole fraction ions | 0.02-1.0 | 0.1-0.7 | 0.25-0.5 |
| Distance Between Electrodes | mm | >0.01 | 0.05 to 0.5 | 0.08-0.3 |
| Flow Direction | | | Said distance between electrodes is for fluid flow from anode to cathode (metal to oxide). | |
| Flow Pulse | | | Pulsed in Volumes equal to void volume of the packed bed. | |
| Forced Voltage Gradients and Buffer Layers | | Anode is has sections of different voltage where the voltage difference (anode versus cathode) of a anode next to the cathode is less than that for section(s) further from the cathode | Where the anode terminal is on anode section further from cathode and a resistor connects the anode section further from the cathode to the anode section next to the cathode | |
| Isolation Check Valve, Air Gap, or Other Means to Connect Cells in Series | | | Double-synchronized positive displacement | |
| Path Clearing Separation | | | Flow-induced Rotating surrogated disc | |
| Thickness of Alternating cathode-electrode sections in the same cell | mm | 1 to 2000 | | |

It is to be understood that while certain now preferred forms of this invention have been illustrated and described, it is not limited thereto except insofar as such limitations are included in the following claims.

Having thus described the invention, what is claimed as new and desired to be secured by Letters Patent is:

1. A convection battery comprising:
an anode electrode layer permeable to flow,
a cathode electrode layer permeable to flow,
a separator layer between said anode and cathode electrode layers,
a circumference surface impermeable to flow, and
two ends permeable to flow and to allow an electrolyte to enter the device and flow through said anode and cathode,
wherein said convection battery further comprises a plurality of said anode electrode, separator and cathode electrode layers wound in a spiral configuration.

2. The convection battery of claim 1 further comprising a current collector layer between said anode electrode layer and said separator layer and between said cathode electrode layer and said separator layer whereby said current collector layers are impermeable to flow.

3. The convection battery of claim 1, wherein the device is a secondary battery.

4. The convection battery of claim 1, wherein said separator layer is permeable to flow.

5. The convection battery of claim 4, wherein flow into or out-of the anode is blocked on a first end by a non-permeable layer, flow into or out of the cathode is blocked on a second end by a non-permeable layer, and said first end is opposite said second end.

6. The convection battery of claim 5 wherein each said anode and cathode electrode layer has non-permeable sections located between said first and second ends that functionally create a flow path where electrolyte flows back and forth between said anode electrode layer and said cathode electrode layer multiple times before exiting the device.

7. The convection battery of claim 5 used in combination with a pump coupled to the ends of the spiral-wound convection electrochemical device to pump electrolyte through the spiral-wound convection electrochemical device.

8. The convection battery of claim 7 further comprising a third electrode connected in series with said pump and the spiral-wound convection electrochemical device to allow electrolyte flow between the spiral-wound convection electrochemical device and said third electrode.

9. The convection battery of claim 5 further comprising a sonic generator that is functionally connected to at least one end of the electrochemical device to send sonic waves through the electrolyte and through the electrochemical device.

10. The convection battery of claim 2 comprising multiple battery cells functionally connected in an electric circuit series with a cumulative voltage output approximately equal to the sum of the voltage outputs of the individual cells.

11. The convection battery of claim 10 comprising at least one section of a plurality of layers where the current collector is a bipolar plate between the anode of one cell and a cathode of another cell.

12. The convection battery of claim 10 whereby the ends are approximately elliptic in shape.

* * * * *